(12) United States Patent
Schroder et al.

(10) Patent No.: US 6,547,050 B1
(45) Date of Patent: Apr. 15, 2003

(54) CONDUCTOR RAIL FOR SUPPLYING POWER AND A PRODUCTION METHOD THEREFOR

(75) Inventors: Arno Schroder, Castrop-Ranxel (DE); Werner Runte, Kamen (DE)

(73) Assignee: Paul Vahle GmbH & Co. KG, Kamen (DE)

( * ) Notice: Subject to any disclaimer, the term of this patent is extended or adjusted under 35 U.S.C. 154(b) by 0 days.

(21) Appl. No.: 09/806,660

(22) PCT Filed: Oct. 8, 1999

(86) PCT No.: PCT/GB99/07575

§ 371 (c)(1),
(2), (4) Date: May 17, 2001

(87) PCT Pub. No.: WO00/21776

PCT Pub. Date: Apr. 20, 2000

(30) Foreign Application Priority Data

Oct. 9, 1998 (DE) .......................................... 198 46 491

(51) Int. Cl.⁷ ................................................. B60M 1/00
(52) U.S. Cl. ..................................................... 191/22.2
(58) Field of Search ................................ 191/22 R, 29, 191/30

(56) References Cited

U.S. PATENT DOCUMENTS

| 3,461,250 A | | 8/1969 | Dehn | |
|---|---|---|---|---|
| 3,850,270 A | * | 11/1974 | Hillman | ....................... 191/29 |
| 3,885,655 A | * | 5/1975 | Corl et al. | ...................... 191/29 |
| 3,902,579 A | | 9/1975 | Howell, Jr. | |
| 4,043,436 A | * | 8/1977 | Segar et al. | ................... 191/32 |
| 4,109,768 A | * | 8/1978 | Fromme et al. | .......... 191/22 R |
| 4,215,770 A | * | 8/1980 | Bormann | .................. 191/23 R |
| 5,249,654 A | | 10/1993 | Bruning | |

FOREIGN PATENT DOCUMENTS

| DE | 553560 | 6/1932 |
|---|---|---|
| DE | 7114522 | 7/1971 |
| DE | 2244492 | 9/1972 |
| DE | 2349127 | 9/1973 |
| DE | 2435641 | 7/1974 |
| DE | 2546026 | 10/1975 |
| DE | 19729415 C 1 | 7/1997 |

* cited by examiner

Primary Examiner—S. Joseph Morano
Assistant Examiner—Robert J. McCarry, Jr.
(74) Attorney, Agent, or Firm—Woodbrige & Associates, PC; Richard C. Woodbridge, Esq; Thomas J. Onka, Esq

(57) ABSTRACT

The invention relates to a conductor rail for supplying power to current consumers. The inventive conductor rail is comprised of a base body (1) and of a slide surface (2a) which is connected to the base body (1) and which is made of an especially wear-resistant material. Connecting elements (5) extending over the length of the slide surface (2) are provided on the side of the part (2) which forms the slide surface (2a); said side pointing toward the base body (1). Each connecting element (5) together with an elongated narrow side (2b) of the slide surface part (2), forms a recess (3). The recess is at least partially filled with the material (6) of the base body (1).

12 Claims, 2 Drawing Sheets

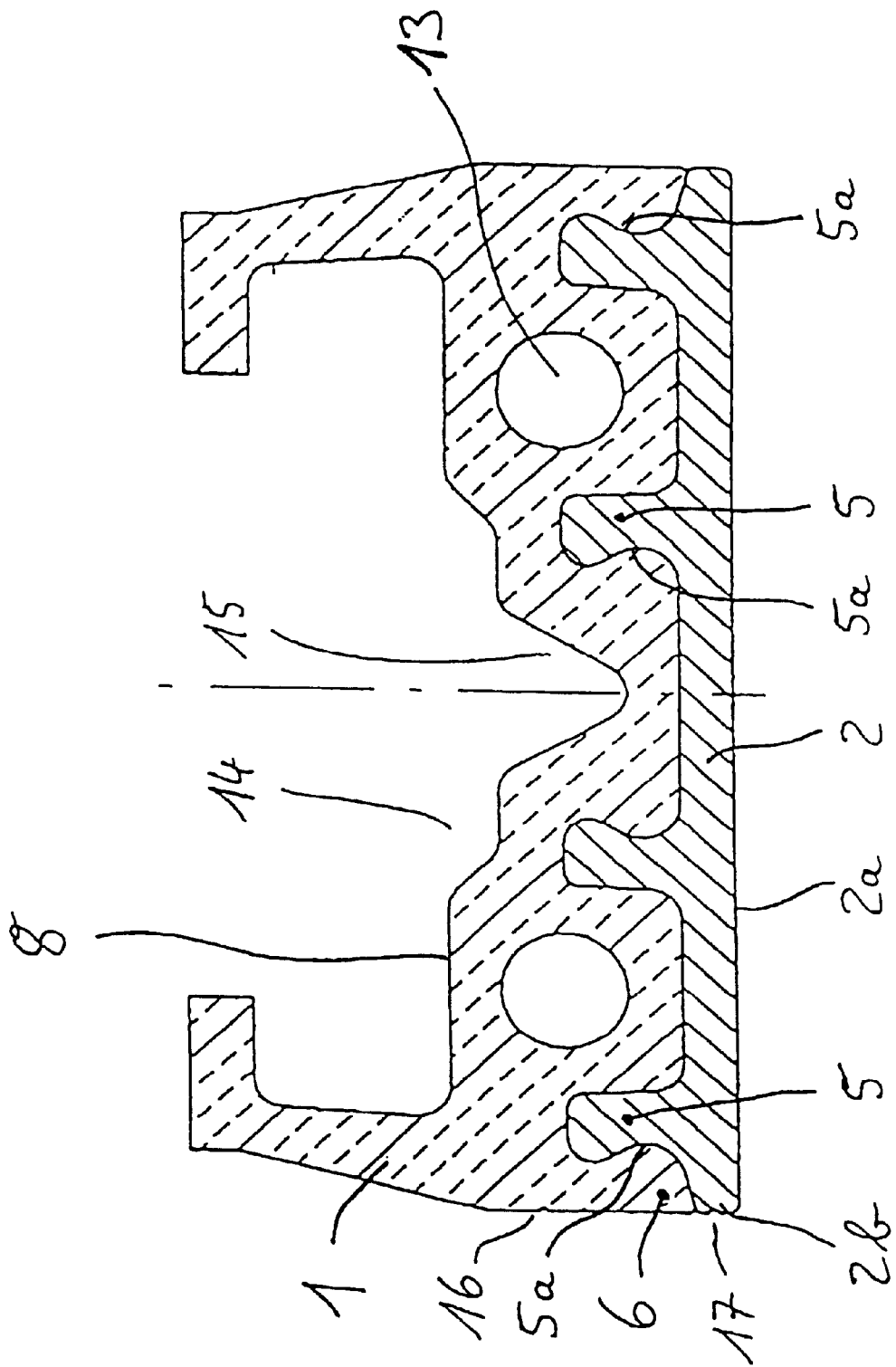

CONDUCTOR RAIL FOR SUPPLYING POWER AND A PRODUCTION METHOD THEREFOR

CROSS REFERENCE TO RELATED APPLICATIONS

This Application claims the priority of German Patent Application Serial Number 198.46.491.6, filed Oct. 9, 1999 and International Patent Application Serial Number PCT/EP99/07575 having an international filing date of Oct. 8, 1999 the entire contents of both of which are incorporated rein by reference.

BACKGROUND OF THE INVENTION

1. Field of Invention

The invention relates to a current conducting rail.

2. Description of Related Art

Current conducting rails for supplying of mobile consumers that are comprised of two different materials are known in the art in numerous embodiments. Said conductor rails are comprised mainly of a base body onto which a sliding surface comprised of especially wear-resistant metal is applied. The German utility model 7114522 demonstrates such a conductor rail comprised of a base body made of metal which exhibits a head in which the sliding surface is folded around the head of the base body.

DT 2349127 discloses to the art a conductor rail for current consumers with high current demand and high travel speed, which exhibits a connector on the side facing the base body and which exhibits undercuts. The sliding surface body together with its contact is inserted at the narrow facial surface of the base into a corresponding groove in the base body that corresponds to the contact. Thereupon the external limbs of the sliding surface are bent against the corresponding sides of the base body using rollers acting upon them. At the same time the sides of the groove of the base body are pressed against the connector such that a permanent connection between the sliding surface and the base body is created.

Similarly, the German patent 2244452 discloses a current rail for the supply of current to movable current consumers with high current requirements and high speeds in which a slide surface comprised of a particularly wear-resistance metal is arranged on the base body. The base body exhibits on its side facing the slide surface a number of dove-tail projections over the length of the base body whereby said projections are engaged by U-shaped recesses in the web of the base body, whose flanks are engaged against the corresponding flanks of the projections on the base body. In the joining process, using rollers, which on the one hand presses together the slide surface serving as the current collector and the lateral wall of the base body to be joined with the slide rail, whereby the walls of the contact situated in the U-shaped recesses of the slide rail are pressed against the corresponding dove-tailed projections. At the same time the outer connecting pieces of the slide rail are engaged against the flanks of the base body in the customary manner using rollers.

The disadvantage in the current rails described in the foregoing is that the slide current conductor material which is always harder than that of the base body, is deformed, whereby there is no optimal adaptation can be produced between the softer material of the base body and the current conductor material at the time of roller shaping. Due to the fact that the current conductor, especially at its outer surfaces, does not optimally lie on the base body material, moisture can intrude between the two parts.

SUMMARY OF THE INVENTION

The purpose of the invention is to provide a current rail with a wear-resistant slide surface that is applied mechanically to the softer base body and in which corrosion does not form between the base body and the slide surface.

This purpose is achieved by a current rail having the characteristics described in claim 1. The current rail described in the invention is characterized by the fact that generally the softer material of the base body deforms and consequently a better connection between base body and slide surface is established. Corrosion formation, which could occur in current rails after the current state of technology whereby moisture from outside could at any time intrude between the base body and the slide surface laterally into the current rail is confronted in that the softer material of the base body, which is made especially of aluminum, is in cross-section is securely rolled onto the external surface or the outside edge of the harder slide surface piece. If, in the case of conventional current rails the base body is laterally wrapped by the harder slide surface material, then in the solution provided by the instant invention the softer material of the base body is pressed onto the harder material of the slide surface.

In order to achieve an optimum fastening between the structures of the base body and slide surface, connecting pieces are formed along the current rail at the slide surface that are especially provided with back-cuts. In the joining process the softer material of the base body is pressed behind the back-cuts, whereby a durable connection between base body and slide surface is achieved.

An advantageous connection between the base body and the slide surface is achieved especially when the base body is made of aluminum and the slide surface is made of stainless steel or copper. The forming of the aluminum base body is advantageously applied in the application in which even a light cold-hardening, but no embrittlement of the aluminum occurs.

In one possible embodiment, all connecting pieces have back-cuts only on one side. On the side of the connecting pieces facing the back-cuts there are slightly conical surfaces with an slope angle of about two degrees. On the side of the base body facing the slide surface structure a plurality of recesses are provided into which the connecting pieces engage prior to the forming process. The recesses are formed slightly conical, whereby the aperture cross-section is larger than the floor cross-section. The aperture angle of the conically arranged side walls likewise are approximately two degrees.

The inside surfaces of the longitudinal recess exhibit in a preferred embodiment longitudinal grooves. Inasmuch as an aluminum structure is used as the base body, a micrometer thin oxide layer always develops. By said grooving said oxidation layer is removed during the joining process, whereby a very satisfactory electrical contact is established between the base body and the slide surface. It is of further advantage if the connecting pieces have a greater peak-to-valley height than the slide surface itself, whereby a very satisfactory bond between the base body and the slide surface material is produced.

For the joining process a roller presses the slide surface material against the base body. A profiled roller presses at the same time the base body against the slide surface structure. In this way, the connecting pieces are pressed into the recesses, whereby the conical surfaces of the recesses and the connecting pieces are compressed against each other. Due to the compression pressure the grooving deforms and adapts to the contour of the shape of the connecting pieces. In the process, the oxidation layer of the aluminum structure is pulled away in the area of the grooving. Another spontaneous oxidation, which would proceed in a few minutes, is prevented by the satisfactory fit between the base body and the slide surface.

In order that the base body material is pressed into the space behind the back-cuts of the connecting pieces of the slide surface structure, a heavily profiled roll is used that is brought to rest on the side of the base body facing away from the slide surface structure.

By means of additional rolls that provide a lateral pressure against the material of the base body, the material is pressed into the recesses facing outward that are formed by the back-cuts of the outside connecting pieces and the long narrow sides of the slide surface. This provides a smooth transition between the material of the base body and that of the slide surface that prevents the intrusion of moisture between the two parts.

In order to prevent unnecessary additional tolerance, it is advantageous if the profiled parts, base body and slide surface, during their extrusion production process, are provided with rolled-in grooves to assure uniform lateral alignment.

Since, in the inventive current rail it is also possible that moisture can penetrate at the current rail end into the interspace between the slide surface and the base body, in a particular embodiment of the invention a contact mass is introduced prior to the joining process between the base body structure and the slide surface structure for the purpose of corrosion prevention, said mass is distributed in the joining process evening and over the entire contact surface.

Subsequently, a possible exemplary embodiment of an current rail according to the invention and its production method is described in detail in conjunction with the following drawings.

BRIEF DESCRIPTION OF THE DRAWINGS

FIG. 3 depicts a cross-sectional view of an assembled current rail according to the invention.

DETAILED DESCRIPTION OF THE PREFERRED EMBODIMENT

Figure 1:
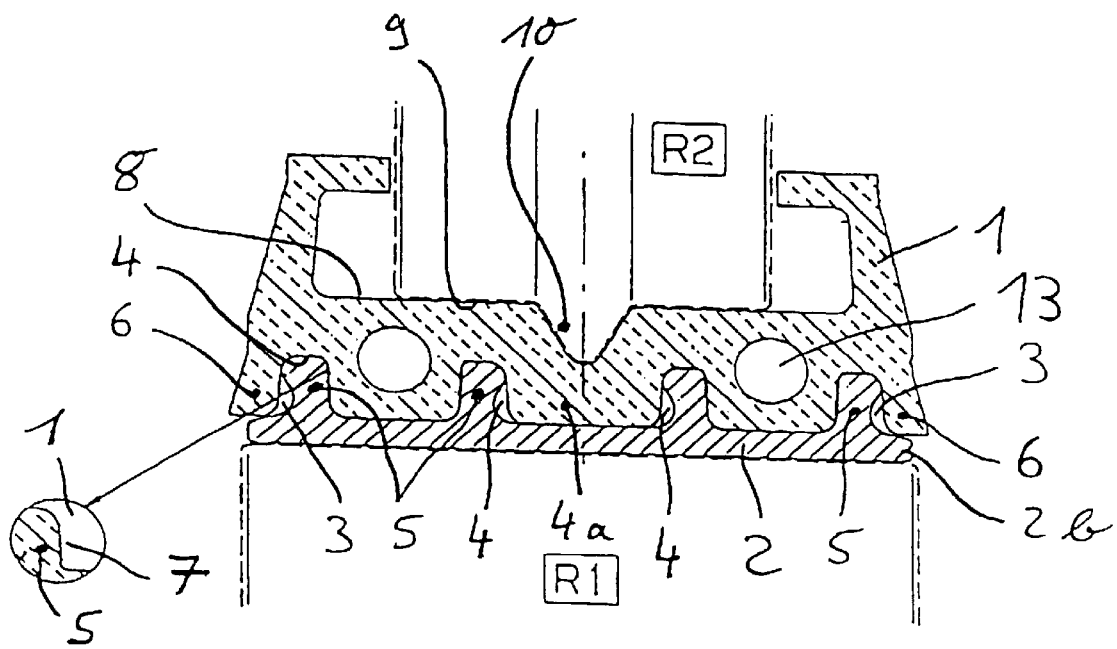
FIG. 1 depicts a cross-sectional view of the assembled structural parts base body and slide surface.

FIG. 1 depicts the two extruded structures 1 and 2 which are compressed against each other by means of the rollers R1 and R2.

The base body 1 exhibits four recesses 4 extending longitudinally along the current rail, in which the connecting pieces 5 of the slide surface structure 2 are situated. The recesses 4 have conically shaped flanks, so that the aperture cross-section is larger than the cross-sectional area of the floor of the recesses 4. This provides for simpler pre-assembly of the base body 1 and slide surface structure 2. The connecting pieces 5 each exhibit back-cuts 5a on one side.

By the action of the rollers R1, R2, and R3 the material of the base body 1 is compressed and is forced behind the back-cuts 5a of the connecting pieces 5 and against the flanks connecting pieces.

The surface of the base body structure 1, which comes into contact with the connecting pieces 5 during the joining process, exhibits in part longitudinal grooving 7, which are also deformed during the joining process. By deforming the grooving the oxide layer in said area pulls off and the result is contact of non-oxidized base body material 7a with the material of the slide surface profile 2.

Figure 2:
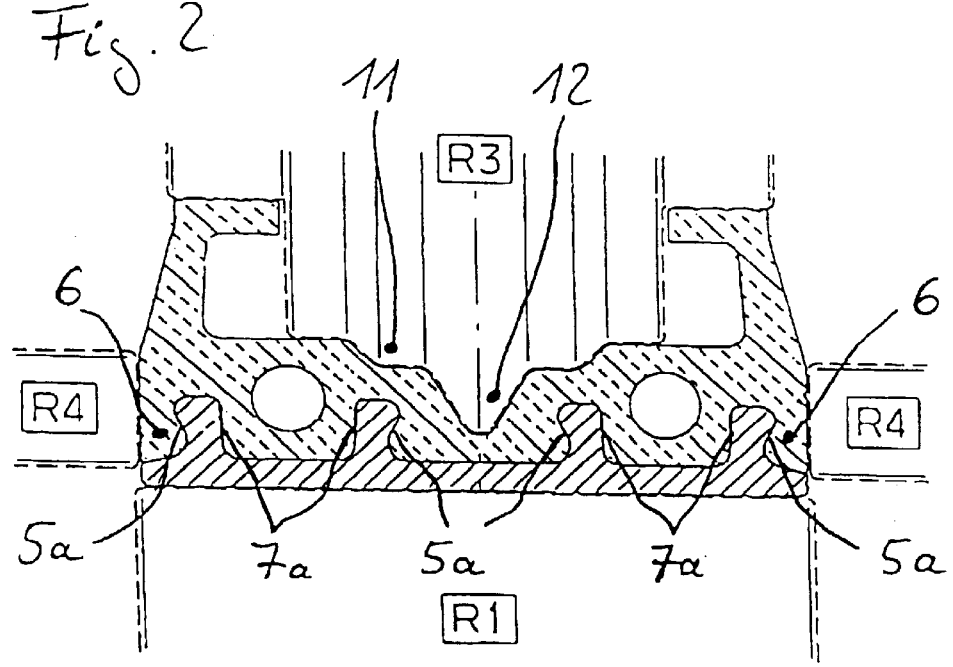
FIG. 2 depicts the production step in which the material of the base body is compressed by means of a roll or pressure roller behind the back-cuts of the connecting pieces of the slide surface structure.

For the purpose of compression of the base body 1 onto the slide surface structure 2 the roller or roll R2 exhibits a flat bearing or application face 9, which supports against the side 8 of the base body facing away from the slide surface structure 2. The roller or roll R2 is profiled and exhibits in a simple embodiment a peripheral horn-shaped protrusion 10, which compresses the material of the base body in such a way that the material in the region of the grooving 7 deforms. Using a second roller R3, as depicted in FIG. 2, which is more heavily profiled than roller R2, the material of the base body 1 is forced behind the back-cuts (reverse protrusions) 5a of the connecting pieces 5. At the same time the outer legs 6 are compressed using lateral pressure rolls or rollers R4 into the recesses 3, so that a smooth transition between the base body 1 and the long narrow sides 2b of the slide surface structure 3 results.

The hollow spaces 13 running longitudinally serve the purpose of saving material and simultaneous increase of surface area of the base body 1. They can exhibit any cross-sectional shape, to take up heating from the ends of the current rail into the hollow space 13.

As depicted in FIG. 3, the V-shaped recesses 14, 15 remain after the joining process on the side 8 of the base body 1 facing away from the slide surface.

The longitudinal grooves 16, 17 which are produced in the base body structure 1 and in the slide surface structure 2 during the extrusion process, serve to simplify arrangement at the time or pre-assembly of the base body 1 and slide surface 2, so that unnecessary additional tolerance by incorrect pre-assembly can be avoided.

Furthermore, the longitudinal grooves 16 and 17 of the finished current rail serve in express lateral arrangement during the installation of the current rail.

We claim:

1. Current rails for supply of current to current consumers comprising a base body (1) and a slide/contact surface (2a) joined to the base body (1) made of an especially wear-resistant material, whereby on the part forming the slide/contact surface (2a) facing the base body (1) connecting pieces (5) extending over the length of the slide/contact surface are provided, and characterized by the fact that a connecting piece (5) together with a long narrow side (2b) of the slide/contact surface (2) forms a recess (reverse protrusion) (3) on the outside edge of said connecting piece (5), which recess is at least partially filled by the material (6) of the base body (1).

2. A current rail according to claim 1 and characterized by the fact that the base body (1) exhibits a number of recesses (4) corresponding to the number of connecting pieces (5) into which the connecting pieces (5) are inserted and the walls of the recesses (4) are compressed by at least one deformation joining process at the surfaces of the corresponding connecting pieces (5).

3. A current rail according to claim 2 characterized by the fact that at least one of the connecting pieces (5) exhibits a back-cut (5a) and the recess (4) brought into contact with the corresponding connecting piece (5) whose back-cut (5a) grips around after the joining process.

4. A current rail according to claim 1 characterized by the fact that the surface of the base body (1) exhibits at least segmentally grooving (7) in those areas that are pressed onto the surface of the connecting pieces (5) of the slide/contact surface part (2) during the joining process.

5. A current rail according to claim 4 and characterized by the fact that the base body (1) is made of aluminum, whereby prior to the joining process an oxide layer forms on the surface of the base body (1) and the grooving (7) is so contrived that in the joining process said oxidized layer is pulled off.

6. A current rail according to claim 1 characterized by the fact that the recesses (4) in the base body (1) prior to the forming process are generally U-shaped.

7. A current rail according to claim 1 characterized by the fact that the base body (1) exhibits at least one hollow space (13) extending over the length of the base body (1) which serves to increase the surface area of the base body (1).

8. A current rail according to claim 1 characterized by the fact that the base body (1) exhibits at least one channel (13) extending over the length of the base body (1) in which there is at least segmentally heating or through which a heating or cooling agent flows.

9. A current rail according to claim 1 characterized by the fact that the base body (1) is an extruded structure comprised of aluminum and the slide/contact surface part (2) is an extruded structure comprised of stainless steel.

10. A process for producing a current rail according to claim 1 characterized by the following steps:

a. in an initial process step the slide/contact surface part (2) is inserted by means of its connecting pieces (5) into the recesses (4) provided therefor, and b. in a second process step using rollers the base body (1) and the slide/contact surface part (2) are compressed together in such a manner that an initial roller (R1) presses against the surface (2a) serving as the current collector surface and a second roller (R3) pressing base body (1), on the side of the base body facing away from the slide/contact surface (2), against the slide/contact part (2) is profiled in such a way that at least one of peripheral protrusions (10, 11, 12) protruding from the roller surfaces (9) presses the material of the base body behind at least one back-cut (5a) of a connecting piece (5) of the slide/contact piece (2), and c. at the same time in or after the second process step b above, rollers (R4) compress the material (6) of the base body (1) laterally from the outside and press said material behind back-cuts (5a) of the recesses (reverse protrusions) (3) formed by the connecting pieces (5) of the slide/contact part (2).

11. A process for the production of a current rail according to claim 10 and characterized by the fact that in the side (8) of the base body (1) facing away from the slide/contact surface (2) a V-shaped notch is present for centering a profiled roller (R2) and that prior to the second process step b, the roller (R2) which its contact face (9) compresses base body (1) and the slide/contact surface part (2) together.

12. A process for the production of a current rail according to claim 11 and characterized by the fact that when using a base body (1) made of aluminum, in which specific surface areas exhibit grooves (7), which come into contact with the connecting pieces (5) of the slide/contact surface (2), at least the oxide layer is pulled off in the region of the grooves (7) at the time of creating the V-shaped notch by the profiled roller (R2).

* * * * *

UNITED STATES PATENT AND TRADEMARK OFFICE
CERTIFICATE OF CORRECTION

PATENT NO.    : 6,547,050 B1
DATED         : April 15, 2003
INVENTOR(S)   : Arno Schroder et al.

It is certified that error appears in the above-identified patent and that said Letters Patent is hereby corrected as shown below:

<u>Title page,</u>
Item [86], the PCT number should read -- PCT/EP99/07575 --

Signed and Sealed this

Twelfth Day of August, 2003

JAMES E. ROGAN
*Director of the United States Patent and Trademark Office*